US006687671B2

(12) United States Patent
Gudorf et al.

(10) Patent No.: US 6,687,671 B2
(45) Date of Patent: Feb. 3, 2004

(54) METHOD AND APPARATUS FOR AUTOMATIC COLLECTION AND SUMMARIZATION OF MEETING INFORMATION

(75) Inventors: Gregory D. Gudorf, Mahwah, NJ (US); Philip Michael Abram, Warwick, NY (US); Marc Beckwitt, San Clemente, CA (US); Kazuaki Iso, Oradell, NJ (US); Brian Raymond, San Diego, CA (US); Brian M. Siegel, Washingtonville, NY (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 483 days.

(21) Appl. No.: 09/804,294

(22) Filed: Mar. 13, 2001

(65) Prior Publication Data

US 2002/0133339 A1 Sep. 19, 2002

(51) Int. Cl.[7] ............................................... G10L 21/06
(52) U.S. Cl. ..................... 704/235; 704/270; 704/278
(58) Field of Search ................................ 704/235, 260, 704/270, 278

(56) References Cited

U.S. PATENT DOCUMENTS

| 4,985,929 | A | | 1/1991 | Tsuyama | 382/48 |
|---|---|---|---|---|---|
| 5,649,060 | A | | 7/1997 | Ellozy et al. | 704/278 |
| 5,884,262 | A | * | 3/1999 | Wise et al. | 704/270 |
| 5,894,306 | A | | 4/1999 | Ichimura | 345/418 |
| 5,926,787 | A | | 7/1999 | Bennett et al. | 704/235 |
| 5,940,800 | A | * | 8/1999 | Bennett et al. | 705/1 |
| 5,956,681 | A | | 9/1999 | Yamakita | 704/260 |
| 5,960,385 | A | | 9/1999 | Skiena et al. | 704/9 |
| 5,970,141 | A | * | 10/1999 | Bennett et al. | 380/9 |
| 6,018,708 | A | | 1/2000 | Dahan et al. | 704/244 |
| 6,023,675 | A | * | 2/2000 | Bennett et al. | 704/235 |
| 6,023,678 | A | | 2/2000 | Lewis et al. | 704/260 |
| 6,173,259 | B1 | * | 1/2001 | Bijl et al. | 704/235 |
| 6,263,051 | B1 | * | 7/2001 | Saylor et al. | 379/88.17 |
| 6,282,510 | B1 | * | 8/2001 | Bennett et al. | 704/235 |
| 6,499,021 | B1 | * | 12/2002 | Abu-Hakima | 706/10 |
| 6,587,547 | B1 | * | 7/2003 | Zirngibl et al. | 379/88.17 |

* cited by examiner

Primary Examiner—Susan McFadden
(74) Attorney, Agent, or Firm—Rader, Fishman & Grauer PLLC

(57) ABSTRACT

A method is applied for providing electronically collected and summarized meeting information. First, verbal sounds are electronically collected. The verbal sounds are transmitted to a processor. The processor automatically converts the verbal sounds, as collected, into an electronic text file. The text from the file is then automatically scanned and summarized, in accordance with a predetermined algorithm for identifying one or more key terms in the text file, into an electronic summary file. The text file and/or the summary file are then automatically and electronically distributed to a predetermined number of users.

17 Claims, 1 Drawing Sheet

METHOD AND APPARATUS FOR AUTOMATIC COLLECTION AND SUMMARIZATION OF MEETING INFORMATION

FIELD OF THE INVENTION

The present invention relates to the field of speech processing technology. The present invention also relates to the field of indexing and aligning of audio and text using speech recognition.

BACKGROUND OF THE INVENTION

During business meetings, one or more people are usually present for the sole purpose of writing or otherwise collecting the points discussed during the meeting. The ability of that person to record minutes and the highlights of key points of the meeting for future reference and use is a skill that is in high demand. This is because the person summarizing the meeting is often not an active participant of the meeting, and must be able to ascertain the important points discussed in the meeting from those points that are less valuable.

Today, technology enables people to meet in the same locale, as well as remotely from virtually anywhere across the globe and space. In spite of today's technology enabled meeting attendance, the process of capturing information discussed or otherwise presented in the meeting is not easily performed by the active participant of the meeting due to their recourses being expended by communicating rather than by collecting notes on what is communicated.

It is therefore evident that there is a need for an improved means of capturing the spoken or recorded verbal proceedings of a meeting, processing such captured data, analyzing and identifying the important highlights of the meeting, and returning the results of the analysis to the participants of the meeting and other interested parties in a suitable format.

SUMMARY OF THE INVENTION

It is an object of the present invention to meet the above-described needs and others. Specifically, an object of the present invention is a method for providing electronically collected and summarized meeting information. First, verbal sounds are electronically collected. The verbal sounds can be words spoken while they are being electronically collected, or words that are prerecorded and then replayed for electronic collection. The collector for electronically collecting the verbal sounds includes a microphone or other audio input including wireless signals.

The verbal sounds are transmitted to a processor. The processor automatically converts the verbal sounds, as collected, into an electronic text file. The text from the file is then automatically scanned and summarized, in accordance with a predetermined algorithm for identifying one or more key terms in the text file, into an electronic summary file. In a preferred embodiment of the invention, the converting, scanning and summarizing steps are performed during the step of electronically collecting verbal sounds.

Supplemental verbal or nonverbal data, including text, pictures, or other media files, can be combined with the summary file or the text file. After any supplemental data is added to the files, the text file and/or the summary file are then automatically and electronically distributed to a predetermined number of users.

The method further includes the step of electronically indexing and archiving the summary file and the text file on a network server. But first, the electronic text file is wirelessly or otherwise transmitted from the processor to the network server that performs the automatic scanning and summarizing steps. The electronically indexed and archived summary and text files are then stored on the network server in a searchable database. During the process of indexing and archiving and storing, the summary and text files are protected by way of a password or other user identification system, selectively preventing access to the files. Once stored and then accessed by a permitted user, the summary and text files can be searched using an electronic searching system. Searching is an electronic process where keywords provided by the user are identified if present, and a search result identifying the location of the keywords in the files is electronically distributed to the user as a search result.

The present invention also includes an apparatus for performing the above method. The apparatus includes a collector for electronically collecting verbal sounds.

A processor is also provided, which automatically converts the verbal sounds, as collected, into an electronic text file. A wireless transmitter can be provided for transmitting the electronic text file from the processor to a network server/processor.

The network server/processor includes software for automatically scanning and summarizing the text, in accordance with a predetermined algorithm for identifying one or more key terms in the text file, into an electronic summary file. The network server further includes software for electronically indexing and archiving the summary file and the text file. The network server also has integrated software for electronically selectively preventing access to the summary file and/or text file. The electronically indexed and archived summary and text files are stored on a searchable database, and the network server further includes software for scanning the summary file and/or text file using keywords provided by a user, and electronically distributing a result of the search to the user.

A distributor automatically and electronically distributes the electronic summary file and/or the text file to a predetermined number of users.

The processor and network server can respectively convert, and scan and summarize while the collector is electronically collecting the verbal sounds.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as set forth in the claims.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Figure 1:
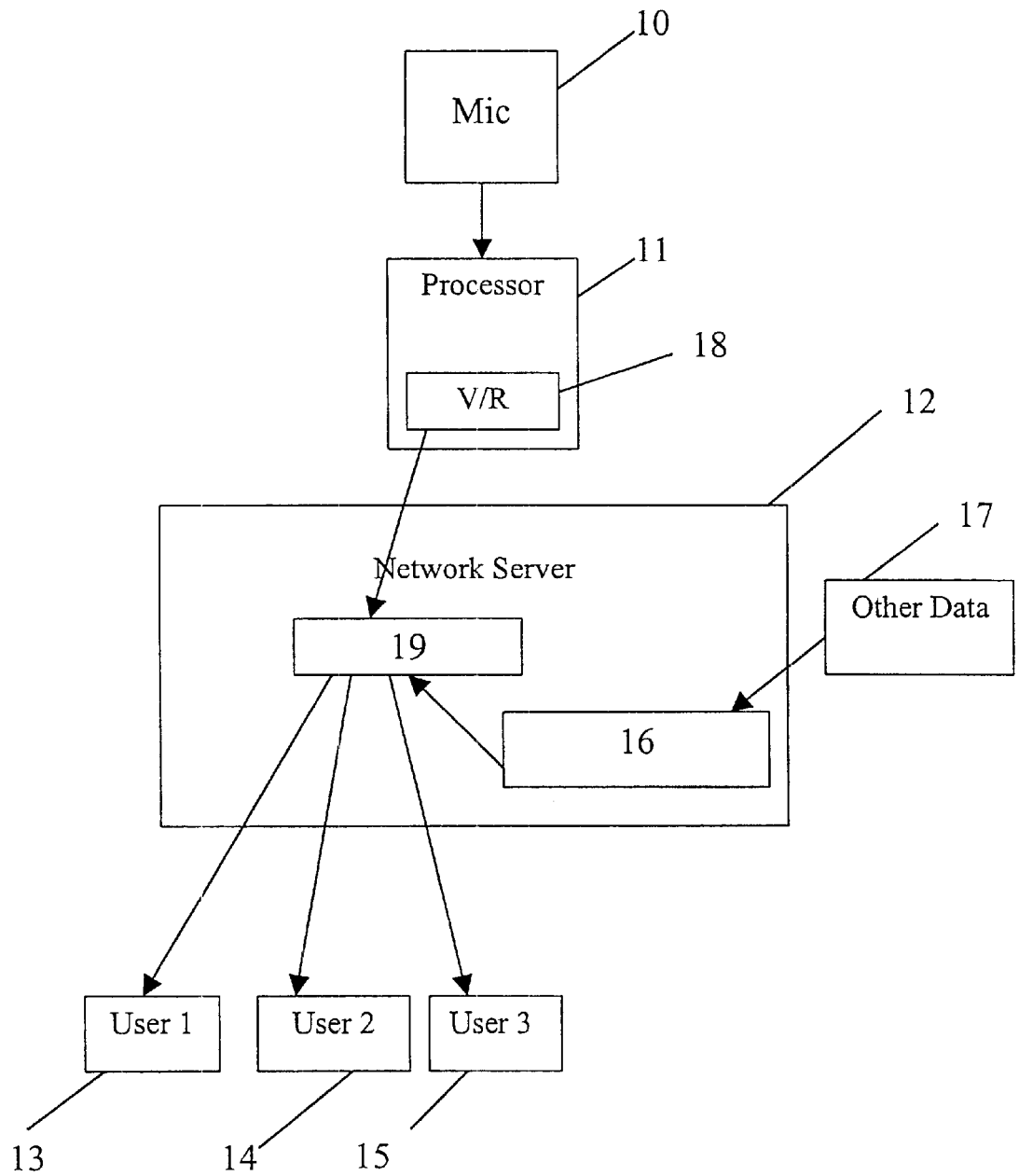
FIG. 1 diagrammatically shows the apparatus of the present invention, and the method performed according to the present invention.

Using the drawings, the preferred embodiments of the present invention will now be explained.

The above-discussed objects are accomplished by an electronic capturer of spoken or earlier recorded verbal proceedings, which captures the text of the verbal proceedings and returns it in an efficient and summarized format to as many users as required. The text is returned to a predetermined number of users via electronic transmission, or other appropriate means.

The invention is summarized in the flow chart of FIG. 1. An audio collection device 10 such as a microphone captures spoken auditory signals from an existing or prerecorded conversation. The auditory signals can be verbal proceedings from a meeting between many speakers, for example. Once captured by the collection device 10, the auditory signals are converted to digital data format using voice recognition software 18 located in a processor 11. The digital data is transferred to a network server 12 through an appropriate connection such as USB, Ethernet, other wired connections, or a wireless connection. At the network server 12, the data is translated to text, indexed, and archived for future retrieval and manipulation by authorized users. The network server includes software 16 that scans the text via a summarizing algorithm to determine key points based on word use, frequency of use, time and place of use within the context of the meeting, and other predetermined and appropriate methodologies. The summary produced by the software 16 is then electronically forwarded to the users 13, 14, 15 such as the meeting attendees and other designated individuals that are either predetermined or otherwise allowed access to the information. Those authorized recipients 13, 14, 15 of the summary could further manipulate the data if necessary. Of course, other electronic data 17 could be collected to supplement the summary. Further, the other electronic data 17 could be collected and subjected to the same processing/indexing/summarizing/distributing method set forth above.

The audio collection device 10, as set forth above, can be a microphone. The audio collection device 10 can also be a plurality of microphones designed to collect audio from a plurality of speakers. An electronic white board is another source of capturing data within the boundaries of the definition of the audio collection device 10.

The audio collection device 10 sends the collected audio to a processor 11, as discussed above. The collected audio is electronically dated as it is fed to the processor 11, or dated by the network server 12 upon being transferred to the network server 12 as digital data. The processor includes voice recognition software 18 that recognizes speech patterns, both generally and specifically in terms of independent speech patterns of certain users. Many software programs and accompanying hardware systems are readily available for voice recognition purposes. U.S. Pat. No. 5,956,681 discloses an exemplary apparatus for generating text data on the basis of speech data that is input from an audio collection device, and the disclosure of the patent is hereby incorporated by reference. The voice recognition software 18 receives the signals from the audio collection device 10 and generates text as an output record.

The network server 12 receives the output record of the generated text. The network server 12 has multiple microsystems including readily available summarizing software 16 that includes algorithms to scan the text. The software 16 scans the text, looking for commonly used elements that appear with frequency, or that are identified in advance as key terms. Many word processing programs including Microsoft Word® include summarizing programs that are within the scope of the software 16 utilized with the present invention. Depending on the degree of summarization that is preselected by the user of the software, the algorithms included in the software 16 identify the key terms based on word use, the frequency of the use, the time and the place of the use within the context of the surrounding text, and other appropriate and predetermined methodologies. The key terms are highlighted in context with the surrounding text, and a summary is produced including all of the highlighted terms and their surrounding text. Other electronic data 17 can be further provided to the network server 12, and combined with the summary as well. The other electronic data 17 can also be summarized using the software 16 in the same manner as described above.

The summary thus produced is, in a preferred embodiment of the invention, a recommended meeting minutes highlight. The audio collection device 10 collects verbal audio signals from a meeting among a plurality of people. As the meeting progresses, the processor 11 and network sever 12, including the associated voice recognition software 18 and the summarizing software 16 are employed. Consequently, a nearly real-time summary is automatically produced as the business meeting occurs. A great advantage of the method of the present invention is the production of the meeting minutes summary without any need for intervention by the participants of the meeting. Upon completion of the meeting, a summary is available for the meeting participants and other users. The other data 17 that may be inputted to supplement the meeting minutes may be summarized as well and included as an integral part of the meeting minutes summary.

Another important aspect of the method of the present invention is the ability to make the summary readily available by automatically storing the meeting information, including both the summary and the complete text received by the network server before summarization, in a searchable database on the internet or other database on the network server. The stored summary and the complete text of the meeting can be automatically sent to predetermined users 13, 14, 15. At any time prior to or after the meeting, data can be entered into the network server 12 that limits with specificity which users can access the meeting information, which users can further manipulate the meeting information, and which users will automatically be sent the meeting information by email or other electronic means. Consequently, access to the summary file or the text file can be electronically and selectively prevented.

According to the method of the present invention, the electronically indexed and archived summary file and text file are stored on the network server 12 in a searchable database 19. The database can be accessed directly through the network server, or indirectly through a medium such as the Internet, which communicates with the network server. Consequently, a user can retrieve, manipulate, and save the text and/or summary files from virtually any location almost immediately after the initial meeting from which the files are created. Further, because the content of the files is stored on a searchable database, the user can scan the summary file and/or the text file using keywords provided by a user. The network server 12 can then provide a result of the search to the user.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method for providing electronically collected and summarized meeting information, which comprises the steps of:

electronically collecting verbal sounds;

automatically converting said verbal sounds, as collected, into an electronic text file using a processor;

automatically scanning and summarizing said text, in accordance with a predetermined algorithm for identifying one or more key terms in said text file, into an electronic summary file; and automatically and electronically distributing said electronic summary file and/or said text file to a predetermined number of users.

2. A method according to claim 1, which further comprises the step of:

electronically indexing and archiving said summary file and said text file on a network server.

3. A method according to claim 2, wherein said step of electronically indexing and archiving includes electronically selectively preventing access to said summary file and/or text file.

4. A method according to claim 2, which further comprises the step of:

storing said electronically indexed and archived summary file and text file on said network server in a searchable database.

5. A method according to claim 4, which further comprises the step of:

scanning said summary file and/or said text file using keywords provided by a user after said storing step; and electronically distributing a result of said search to said user.

6. A method according to claim 1, wherein said converting, and scanning and summarizing steps are performed during said step of electronically collecting verbal sounds.

7. A method according to claim 1, which further comprises the step of:

combining supplemental data with said summary file prior to said step of automatically and electronically distributing said electronic summary file.

8. A method according to claim 1, wherein said electronic text file is wirelessly transmitted from said processor to a network server that performs said automatically scanning and summarizing step.

9. A method according to claim 1, wherein said verbal sounds are one or more from the group consisting of prerecorded verbal messages and words spoken during said collecting step.

10. A method according to claim 1, wherein said collecting step is performed using a wireless transmission of the verbal sounds to said processor.

11. An apparatus for providing electronically collected and summarized meeting information, which comprises:

a collector for electronically collecting verbal sounds;

a processor, which automatically converts said verbal sounds, as collected, into an electronic text file;

a network server and processor, including software for automatically scanning and summarizing said text, in accordance with a predetermined algorithm for identifying one or more key terms in said text file, into an electronic summary file; and a distributor for automatically and electronically distributing said electronic summary file and/or said text file to a predetermined number of users.

12. An apparatus according to claim 11, wherein said network server further comprises software for electronically indexing and archiving said summary file and said text file.

13. An apparatus according to claim 12, wherein said network server further comprises software for electronically selectively preventing access to said summary file and/or text file.

14. An apparatus according to claim 12, which further comprises:

a searchable database, storing said electronically indexed and archived summary file and text file.

15. An apparatus according to claim 14, wherein said network server further comprises software for scanning said summary file and/or said text file using keywords provided by a user after said storing step, and electronically distributing a result of said search to said user.

16. An apparatus according to claim 11, wherein said processor, and network server can respectively convert, and scan and summarize while said collector is electronically collecting said verbal sounds.

17. An apparatus according to claim 11, which further comprises a wireless transmitter, transmitting said electronic text file from said processor to said network server.

* * * * *